No. 819,558. PATENTED MAY 1, 1906.
G. KLEY.
WEIGHING APPARATUS.
APPLICATION FILED JULY 15, 1905.

UNITED STATES PATENT OFFICE.

GUSTAV KLEY, OF SIEGBURG, GERMANY.

WEIGHING APPARATUS.

No. 819,553.  Specification of Letters Patent.  Patented May 1, 1906.

Application filed July 15, 1905. Serial No. 269,823.

*To all whom it may concern:*

Be it known that I, GUSTAV KLEY, a subject of the German Emperor, and a resident of Siegburg, Germany, have invented a certain new and useful Improvement in Weighing Apparatus, of which the following is a specification.

This invention relates to a weighing apparatus wherein a single weight is employed to determine the mass of the load, which weight is pendulatingly supported from a two-armed rolling lever. Each position of the rolling lever corresponds to a definite load, so that the rolling lever serves to indicate at the same time the amount of the weight being measured.

The accompanying drawings show two embodiments of my invention.

Figure 1:
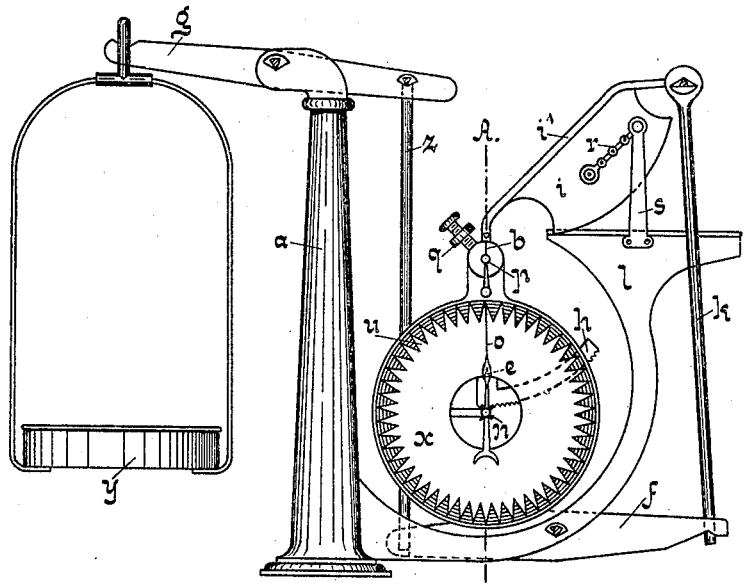
Figures 2, 3, 4:
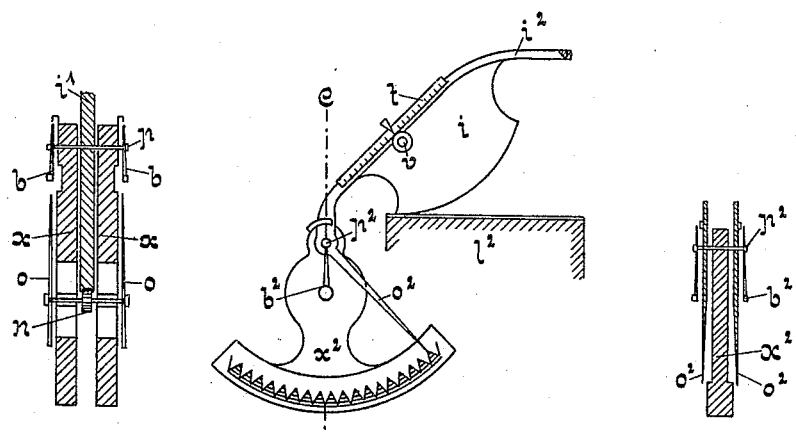

Figures 1 and 2 show a commercial form of balance, wherein the suspended weight is provided with a dial, while the rolling lever actuates an indicator or pointer which travels over said dial. Figs. 3 and 4 show a modification of the weight in which manual adjustment is made for small loads.

The apparatus shown in Fig. 1 comprises a pillar $a$, carrying the two-armed lever $g$, from one arm of which is suspended the scale-pan $y$, while the other is connected, by means of the tension-rod $z$, with the two-armed lever $f$. By means of the lever $f$ an up-and-down movement is transmitted to the rod $k$ and thence to the rolling lever $i$, which rolls on the stationary horizontal plate $l$ and, corresponding to the increase of the load, increases the length of the lever-arm from which the weight $x$ is suspended. The weight is made in two parts, and its circular surface is formed with a dial $u$, which indicates up to five-hundred-grams load. The exact regulation of the balance is obtained by adjusting the weight $q$ and can be controlled by the pendulum $b$. The weight is pendulatingly supported from the spindle $p$. The rod $i'$, which carries the rolling lever $i$, is extended and ends between the halves of the weight in a toothed segment $h$, which is marked off into divisions, each mark corresponding to a variation in the load of half a kilogram. The kilograms are read off on the segment $h$ by means of a mark $e$ on the weight, while the grams are given by the pointer $o$ on the circular dial $u$. The latter is divided after the manner of a transversal scale, so that readings of one gram can be taken with the desired accuracy. The segment $h$ meshes with a pinion $n$, concentric with the dial, and rotates the pointer $o$. The transmission is such that the pointer $o$ has completed one rotation when the arc $h$ has been turned the distance of one mark thereon—that is, has been turned through the distance corresponding to half a kilogram.

The operation is as follows: When the load is placed on the scale-pan $y$, the movement is transmitted, through the levers $g$ and $f$, to the lever $i$, which rolls on the plate $l$. The lever $i$ describes a curve, the segment $h$ rotating around the point $p$, and thereby rotating the pinion $n$ and pointer $o$. The weight remains vertical throughout, so that the amount of the load can be determined by the position of rest of the pointer $o$. In order to prevent the weight going beyond the final position, a chain $r$ is secured to the lever $i$ at one end and at the other end to the stationary holder $s$.

In the modification shown in Fig. 3 the weight $x^2$ is in one piece and has concentric with its point of suspension $p^2$ a graduated scale on which amounts of load can be read at intervals of fifty grams. The pendulum $b^2$ is also suspended from the pivot $p^2$ and moves over a protractor on the weight $x^2$. The rod $i^2$ is made in two parts embracing the weight and carries at both sides pointers $o^2$, which are adapted to rotate relative to the graduated scale. Determination of quantities under fifty grams is effected by hand by moving a sliding weight $v$ along a graduated scale $t$. When this apparatus is in use, the lever $i$ rolls on the plate $l^2$, so that the pointer $o^2$ swings over the graduated scale on the weight $x^2$, which is kept upright by its pendulatory suspension. Should the pointer stop between two marks, the exact reading must be determined by moving the weight $v$ up its graduated scale until the pointer $o^2$ comes opposite the next mark. The number of grams indicated by the sliding weight must then be subtracted from the total weight indicated by the pointer $o^2$, so as to give the true weight of the load being measured. As the finer adjustment can be effected by hand, this modification is specially adapted for large loads, while the construction shown in Fig. 1 is that more commonly used in commerce.

In both these constructions the graduated part is attached to the weight, so that the customer as well as the salesman has a control over the amount of the weight.

Having now described my invention, what I claim, and desire to secure by Letters Patent of the United States, is—

1. In weighing apparatus, the combination with means for supporting the load of a rolling lever, a support on which said lever rolls, a weight suspended from said lever, a device carried by said weight for indicating the load, and means for actuating said device on the rolling movement of said lever.

2. The improved weighing apparatus, comprising, in combination, means for supporting the load, a lever having a rolling face, a connection between said lever and said load-supporting means, a surface over which said lever rolls, a weight suspended from said lever, a dial on said weight and a pointer actuated from said lever traveling over said dial.

3. The improved weighing apparatus, comprising, in combination, means for supporting the load, a lever having a curved rolling face, a connection between said load-supporting means and said lever, a surface over which said lever rolls, a weight suspended from said lever, a graduated toothed sector connected to said lever, a pinion mounted on said weight and engaging the sector, a pointer carried by said pinion and a graduated dial carried by said weight, as and for the purpose set forth.

4. The improved weighing apparatus comprising, in combination, means for supporting the load, a lever having a rolling face, a connection between said lever and said load-supporting means, a weight suspended from said lever and provided with indicating-marks, a pointer traveling over said marks and means for rotating said pointer on the movement of said lever.

In testimony whereof I have signed my name to this specification in the presence of two subscribing witnesses.

GUSTAV KLEY.

Witnesses:
  WILLIAM RUEPPERS,
  JOH. SCHULZ.